Nov. 23, 1937.    H. R. TEAR    2,100,092
LUBRICATING DEVICE
Filed April 2, 1936    3 Sheets-Sheet 1

INVENTOR
HARRY R. TEAR.
BY
ATTORNEY

Nov. 23, 1937.  H. R. TEAR  2,100,092
LUBRICATING DEVICE
Filed April 2, 1936  3 Sheets-Sheet 3

INVENTOR
HARRY R. TEAR.
BY
ATTORNEY

Patented Nov. 23, 1937

2,100,092

UNITED STATES PATENT OFFICE 2,100,092

LUBRICATING DEVICE

Harry R. Tear, Evanston, Ill., assignor to The Lubrication Corporation, Chicago, Ill., a corporation of Delaware Application April 2, 1936, Serial No. 72,317

21 Claims. (Cl. 221—47.3)

This invention relates to lubricating devices and more particularly to fluid pressure operated lubricant dispensers and control means therefor.

Fluid operated lubricant dispensers have been proposed as shown by the patents to Barks No. 1,939,943 and Gille et al. No. 1,834,698 which operate automatically to dispense a plurality of lubricant discharges or shots in rapid succession. These devices are satisfactory where it is desired to dispense a large quantity of lubricant into a fitting or the like but it is extremely difficult, if not impossible, to control them to dispense a single discharge or shot of lubricant as is frequently desirable in servicing a machine.

Devices of this type also have been proposed as shown by the patent to Hatfield No. 1,743,968 which operate to dispense a single discharge or shot of lubricant upon each operation of the trigger or other control means. These devices are, however, extremely tedious where a relatively large quantity of lubricant is to be dispensed as in servicing a bearing or the like requiring a number of pump discharges or shots of lubricant.

In copending application Serial No. 623,942 filed jointly by myself and Harris C. Roth, a lubricant dispenser is disclosed embodying the desirable features of each of these prior types and capable of operation to produce a single shot of lubricant or of semi-automatic operation to produce a plurality of shots in rapid succession. This dispenser, however, depends upon a trigger reaction for its automatic operation.

Accordingly it is one of the objects of the present invention to provide a fluid operated lubricant dispenser which will operate to produce a plurality of shots of lubricant in rapid succession or which can be operated to produce only a single shot as desired.

Another object of the invention is to provide a lubricant dispenser having an automatic valve and control means which will permit the valve to operate automatically or which will prevent automatic operation of the valve.

Another object of the invention is to provide a lubricating device having a three-position control member in one of which positions the device is inoperative, in another of which positions the device operates automatically to dispense a plurality of shots of lubricant in rapid succession and in the third of which positions the device operates to produce only a single shot of lubricant.

Other objects, advantages and novel features of the invention will be apparent from the following description when read in connection with the accompanying drawings, in which.

Figure 1:
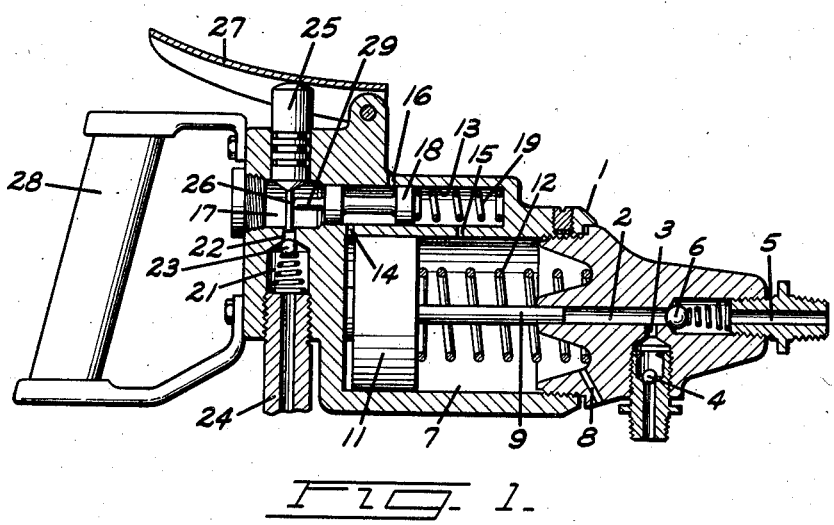
Fig. 1 is a central section with parts in elevation of a lubricant dispenser embodying the invention.
Figure 2:
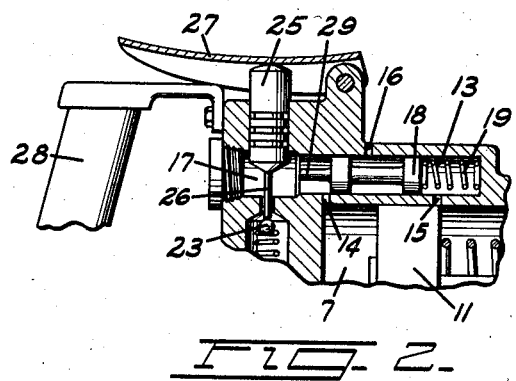
Figs. 2 and 3 are partial views similar to Fig. 1 showing different positions of the parts.
Figure 3:
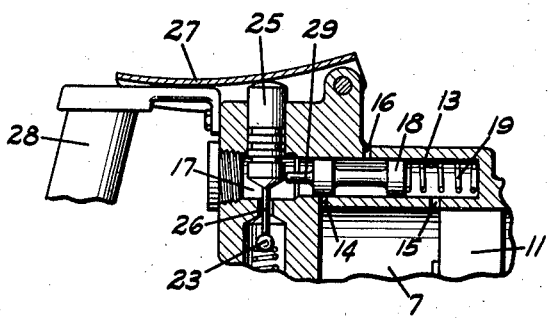

The dispenser of Figs. 1 to 3 comprises a body indicated generally at 1 formed with a lubricant cylinder 2 having an inlet 3 controlled by an inwardly opening check valve 4 and an outlet 5 adapted to be connected to any suitable form of discharge nozzle or flexible conduit and controlled by an outwardly opening check valve 6. The body is formed with a fluid motor cylinder 7 coaxial with the cylinder 2 and having a vent opening 8 adjacent its forward end. Interconnected pistons 9 and 11 are slidably mounted in said cylinders respectively and are urged toward their inlet position as shown in Fig. 1 by a coil spring 12.

The body is formed with a valve cylinder 13 parallel to the cylinders 2 and 7 and having an inlet port 14 connecting its central portion to one end of the motor cylinder 7. A port 15 connects the central portion of the motor cylinder 7 to the valve cylinder 13 adjacent one end thereof. The valve cylinder is provided with an exhaust port 16 arranged between the ports 14 and 15 and is in open communication at one end with an inlet chamber 17.

A spool type valve 18 is slidably mounted in the valve cylinder and is urged toward its exhaust position shown in Fig. 1 by a coil spring 19. The chamber 17 is connected to an inlet valve chamber 21 by a port 22, passage of air through which is controlled by a spring pressed check valve 23. An air inlet pipe 24 leading from a suitable source of air under pressure is connected to the chamber 21.

In order to control operation of the dispenser a valve operating member 25 is slidably mounted in the body 1 at right angles to the axis of the valve chamber 13. The member 25 has reduced stem 26 projecting from one end thereof and its opposite end extends outwardly of the body 1. The position of the member 25 may be controlled by a lever 27 having a thumb portion overlying a suitable handle 28, the lever 27 being adapted to be engaged and moved by the operator's thumb.

In operation the lubricant inlet 3 may be connected to a suitable source of lubricant such as a flexible conduit leading to a source of lubricant supply or a reservoir adapted to contain a supply of lubricant. The conduit 24 may be connected to a suitable source of air under pressure and the device is ready for operation. The position shown in Fig. 1 is that which the parts will normally occupy with the pistons 9 and 11 urged toward their inlet position by the spring 12 and the valve 18 urged toward its exhaust position by the spring 19. It will be noted that in this position the valve 23 is closed by its spring and the member 25 and lever 27 are raised to their uppermost positions.

As the lever is moved to its second position indicated in Fig. 2 the member 25 will be lowered until its stem 26 engages the valve 23 and urges it from its seat, thereby permitting air to flow into the inlet chamber 17 to exert pressure against the end of the valve 18. The pressure of the air will urge the valve to the right against the action of spring 19 until the inlet port 14 is in communication with the inlet chamber 17 at which time air will flow into the cylinder 7 and urge the pistons 11 and 9 to the right, the piston 9 forcing a charge of lubricant in the cylinder 2 out the outlet 5 during this operation. As the piston 11 travels to the right, it will eventually reach the position shown in Fig. 3 in which its rear edge uncovers the port 15. Air will, therefore, flow through the port 15 into the valve cylinder 13 at the opposite end of the valve to balance the pressure exerted by the air in the inlet chamber 17. The valve now being balanced, it will be again moved to its exhaust position shown in Fig. 1 by the spring 19 and air in the cylinder 7 will exhaust to atmosphere through the ports 14 and 16 around the reduced portion of the valve. The pistons 9 and 11 will, therefore, move back under the influence of spring 12 toward the position of Fig. 1, the piston 9 drawing a fresh charge of lubricant into the cylinder 2 past inlet check valve 4 during this movement.

As soon as the front edge of the piston 11 has passed the port 15, air in the valve cylinder 13 will exhaust through the port 15 and cylinder 7 out the vent 8. Air pressure on the valve again being unbalanced, the valve will be moved by the pressure in inlet chamber 17 to its position of Fig. 2 and the operation will be repeated. It will be appreciated that this operation is fully automatic and will occur quite rapidly.

If it is desired to dispense only a single shot of lubricant, the operator may force the lever 27 still further down into its third position illustrated in Fig. 3. In this position the stem 26 retains the valve 23 open but the body of the member 25 has moved down into the path of travel of the valve 18 or of an extension 29 thereon. Therefore, when the piston 11 has reached the position shown and air is admitted into the valve chamber 13 as described above, the valve 18 will not be permitted to travel into its exhaust position due to engagement of the projection 29 with the member 25.

The valve will thus be held in an intermediate position which will prevent any further movement of the piston 11 until the lever 27 is released. In this way a single shot operation may be produced without creating any reaction on the trigger 27.

Figure 4:
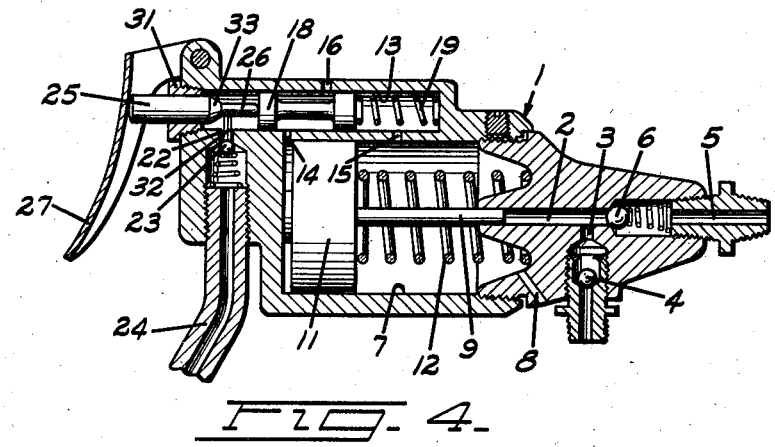
Fig. 4 is a central section with parts in elevation of a modified form of lubricant dispenser.
Figure 5:
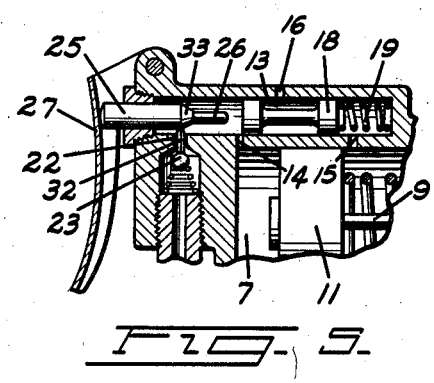
Figs. 5 and 6 are partial views similar to Fig. 4 showing different positions of the parts.
Figure 6:
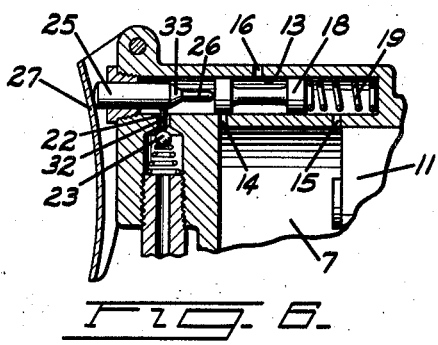

The Figs. 4 to 6 illustrate a modified form of the invention which is similar in many respects to the form of Figs. 1 to 3 and for the sake of brevity of description parts in Figs. 4 to 6 corresponding to like parts in Figs. 1 to 3 will be designated by the same reference numbers. In the form of Figs. 4 to 6 the end of the valve cylinder 13 is closed by a screw threaded plug 31 having a cylindrical bore therethrough slidably to receive the member 25. It will be noted that in this arrangement the member 25 is arranged to slide coaxially with the valve cylinder 13. The inlet valve 23 is adapted to be operated by a plug 32 slidable in the port 22 and preferably formed with square or otherwise irregular cross-section to permit the flow of air therearound through the port 22. The member 25 is formed with a tapered cam portion 33 adapted to engage the plug 32 and move it downwardly to open the valve 23.

In the operation of this embodiment when the lever 27 is in the position of Fig. 4 the valve 23 is closed and the valve 18 will occupy its exhaust position as shown under the influence of the spring 19. The pistons 9 and 11 will also occupy the positions shown under the influence of the spring 12. To operate the device automatically the operator may move the lever 27 into its second position shown in Fig. 5 in which the member 25 is moved far enough so that the cam portion 33 thereof will cam the pin 32 downwardly to open the inlet valve 23. At this time air will flow into the valve cylinder 13 to urge the valve 18 to the right against its spring 19 and establish communication between the inlet port 22 and the port 14. Air will, therefore, flow into the cylinder 7 behind the piston 11 and urge the pistons 11 and 9 to the right to force out a charge of lubricant in the cylinder 2.

As the piston 11 travels forwardly its rear edge will uncover the port 15 thereby admitting a charge of air into the cylinder 13 at the opposite end of the valve 18 to balance the pressure on both ends of the valve. The spring 19 will then urge the valve 18 back into its exhaust position shown in Fig. 4 at which time air in the cylinder 7 will be exhausted through the ports 14 and 16 around the reduced portion of the valve. This will permit the pistons 9 and 11 to return to the position shown in Fig. 4, the piston 9 drawing a charge into the cylinder 2 past the check valve 4 during this motion. When the forward edge of the piston 11 again passes the port 15, air in one end of the cylinder 13 will be exhausted through the ports 15 and 8 and the pressure acting on the opposite end of the valve 18 will again move the valve to the position of Fig. 5 and the cycle will be repeated automatically as long as the lever 27 is held in the position shown in Fig. 5.

If it is desired to produce a one shot operation of the device the lever 27 may be moved to its third position shown in Fig. 6. It will be noted that in this position the valve 23 is held open and that the pin 26 of the member 25 projects into the path of movement of the valve 18. Therefore, when the valve 18 attempts to move to the left under the influence of the spring 19 when the pressure on opposite ends thereof is balanced through the port 15, the end of the valve strikes the pin 26 and is prevented from moving into its exhaust position. Therefore, after discharge of a single shot of lubricant the parts will be held in the position shown in Fig. 6 until the lever 27 is released.

It will be noted that the only force exerted by the valve 18 on the pin 26 and member 25 is that produced by the spring 19 since the air pressure on opposite sides of the valve is balanced. This is a relatively small force and will not create a noticeable reaction on the lever 27 so that there is no tendency to tire the operator or to move the lever 27 against the force applied thereto.

Figs. 7 to 10 illustrate a further modified form of the invention, parts therein corresponding to like parts in Figs. 1 to 3 being indicated by the same reference numbers. In the modification of Figs. 7 to 10 the valve spring 19 urges the valve 18 to its inlet position and the exhaust port 16, instead of being arranged between the ports 14 and 15, is formed in the cylinder 13 adjacent the end thereof in which the spring 19 is mounted. The port 22 which is controlled by the inlet check valve 23 opens into a cylinder 35 which communicates with the valve cylinder 13 through a port 36. The valve operating member 25 is formed with a cam portion 33 and a pin 26 extends outwardly from the cam portion and is adapted to pass through the port 36 for a purpose to appear later. A spring 38 urges member 25 outward against handle 27.

The body 1 is formed integrally with or suitably connected to a tubular handle 37 in which the lever 27 is pivoted intermediate its ends, the handle having an opening therein through which the end of the lever 27 projects to form a trigger. The opposite end of the lever rests on the valve operating member 25.

Figure 7:
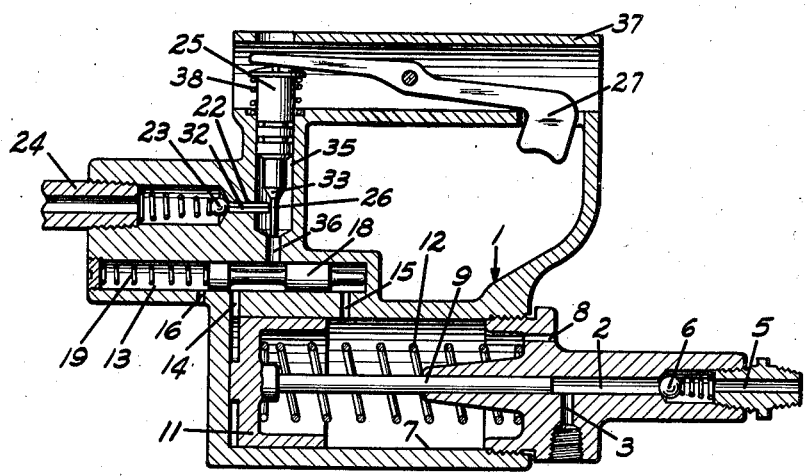
Fig. 7 is an axial section with parts in elevation of a further modified form of lubricant dispenser embodying the invention.
Figure 8:
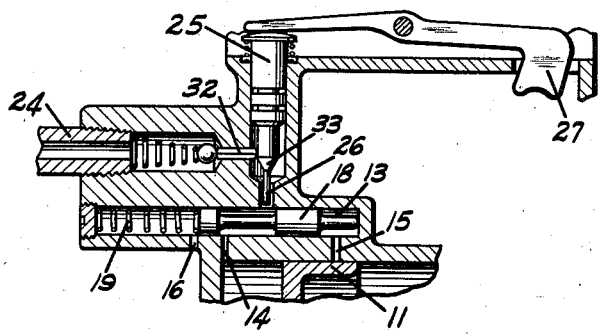
Figs. 8, 9 and 10 are partial views similar to Fig. 7 showing different positions of the parts.

When the parts are in the position shown in Fig. 7, the valve 23 is closed by its spring and the member 25 is raised to its uppermost position by spring 38, the trigger end of the lever 27 at this time projecting the maximum distance through the opening in the handle 37. To operate the device the lever 27 may be rocked about its pivot by engaging the trigger end thereof and moving it into the position of Fig. 8 in which the member 25 is depressed to such an extent that the cam portion 33 thereof moves the pin 32 toward the valve 23, unseating the latter from its seat. At this time air will flow from a conduit 24 past the valve 23 through the ports 36 and 14 around the reduced portion of the valve 18 into the cylinder 7 behind the piston 11. The pistons 9 and 11 will, therefore, be moved to the right to discharge a charge of lubricant from the chamber 2.

Figure 9:
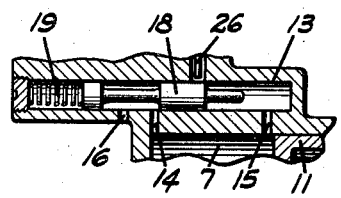

When the rear edge of the piston 11 passes the port 15 as shown in Fig. 9, air will flow into the valve cylinder 13 at the right end of the valve 18 and will urge the valve to the left against the action of its spring 19. At this time the port 14 will be in communication with the exhaust port 16 around the reduced portion of the valve and air in the cylinder 7 will be exhausted, permitting the pistons 9 and 11 to move to the left under the influence of the spring 12. As the end of the piston 9 passes the lubricant inlet port 3, a new charge of lubricant will be drawn or forced into the cylinder 2. When the forward edge of the piston 11 uncovers the port 15 air in the valve cylinder 13 will be exhausted through the port 15 and vent 8 and the valve 18 will again return to its position of Fig. 7 under the influence of the valve spring 19. Air will again flow into the cylinder 7 through the ports 36 and 14 around the reduced portion of the valve and the cycle will be repeated automatically to produce a series of rapid discharge strokes of the pump.

Figure 10:
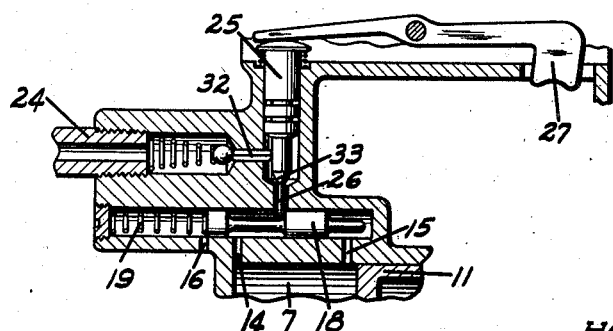

If it is desired to produce only a single shot of lubricant the lever 27 may be rocked further about its pivot into the position of Fig. 10 to move the member 25 further downwardly and cause the pin 26 to project into the valve chamber. In this position the valve 18 is prevented from moving into its exhaust position by engagement of the pin 26 therewith and the parts will remain in the position shown in Fig. 10 until the lever 27 is released. Thus only a single shot of lubricant will be discharged.

While several embodiments of the invention have been shown and described, it will be apparent that many changes might be made therein and it is not intended that the scope of the invention shall be limited to the forms shown or otherwise than by the terms of the appended claims.

I claim:

1. A lubricating device comprising, a lubricant pump having a piston mounted for reciprocation, a fluid motor having a piston mounted for reciprocation and directly connected to said pump piston, a control valve for controlling intake of fluid to and exhaust of fluid from said motor, said valve having an inlet and an exhaust position, resilient means for constantly urging said valve toward one of said positions, means to admit fluid pressure to one end of said valve to urge it to the other of said positions, and means controlled by operation of the motor to admit fluid pressure to the other end of the valve to balance the pressure thereon whereby said resilient means may return it to said one of its positions.

2. A lubricating device comprising, a lubricant pump having a piston mounted for reciprocation, a fluid motor having a piston mounted for reciprocation and directly connected to said pump piston, a control valve for controlling intake of fluid to and exhaust of fluid from said motor, said valve having an inlet and an exhaust position, resilient means for constantly urging said valve toward one of said positions, means to admit fluid pressure to one end of said valve to urge it to the other of said positions, and means controlled by operation of the motor to admit fluid pressure to the other end of the valve to balance the pressure thereon whereby said resilient means may return it to said one of its positions.

3. A lubricating device comprising, a lubricant pump having a piston mounted for reciprocation, a fluid motor having a piston mounted for reciprocation and directly connected to said pump piston, a control valve for controlling intake of fluid to and exhaust of fluid from said motor, said valve having an inlet and an exhaust position, resilient means for constantly urging said valve toward one of said positions, manual means for controlling admission of fluid to said valve, means under the control of the motor for controlling reciprocation of said valve as the motor operates, and means controlled by said manual means for preventing said reciprocation of the valve.

4. A lubricating device comprising, a lubricant pump having a piston mounted for reciprocation, a fluid motor having a piston mounted for reciprocation and directly connected to said pump piston, a control valve for controlling intake of fluid to and exhaust of fluid from said motor, said valve having an inlet and an exhaust position, resilient means for constantly urging said valve toward one of said positions, a second valve for controlling admission of fluid to said first valve, means under the control of the motor for controlling reciprocation of said valve as the motor operates, manual means for operating said second valve, and means associated with said manual means to prevent said first valve from reciprocating.

5. A lubricating device comprising, a lubricant pump having a piston mounted for reciprocation, a fluid motor having a piston mounted for reciprocation and directly connected to said pump piston, a control valve for controlling intake of fluid to and exhaust of fluid from said motor, said valve having an inlet and an exhaust position, resilient means for constantly urging said valve toward one of said positions, a second valve for controlling admission of fluid to said first valve, means under the control of the motor for controlling reciprocation of said valve as the motor operates, and a control for said valves having one position in which said second valve is closed, a second position in which the second valve is open and the first valve is reciprocated automatically, and a third position in which the second valve is open and the first valve is held against reciprocation.

6. In a lubricating device having a fluid motor, a control for said motor comprising, a reciprocably mounted valve having inlet and exhaust positions, resilient means for constantly urging said valve toward one of said positions, means under the control of the motor for controlling reciprocation of said valve as the motor operates and means to lock the valve against reciprocation.

7. In a lubricating device having a fluid motor, a control for said motor comprising, a reciprocably mounted valve having inlet and exhaust positions, resilient means for constantly urging said valve toward its exhaust position, means to admit fluid pressure to one end of the valve to urge it to its inlet position, and means controlled by the operation of the motor to admit fluid pressure to the opposite end of the valve to balance the pressure thereon whereby said resilient means may return the valve to its exhaust position.

8. In a lubricating device having a fluid motor, a control for said motor comprising, a reciprocably mounted valve having inlet and exhaust positions, resilient means for constantly urging said valve toward its exhaust position, means to admit fluid pressure to one end of the valve to urge it to its inlet position, means controlled by the operation of the motor to admit fluid pressure to the opposite end of the valve to balance the pressure thereon whereby said resilient means may return the valve to its exhaust position, and means operable at will to prevent the valve from returning to its exhaust position.

9. In a lubricating device having a fluid motor, a control for said motor comprising, a reciprocably mounted valve having inlet and exhaust positions, resilient means for constantly urging said valve toward its inlet position, means under the control of the motor for controlling reciprocation of the valve as the motor operates to urge the valve to its exhaust position at a predetermined point in the cycle of motor operation, and means operable at will to prevent movement of the valve to its exhaust position.

10. In a lubricating device having a fluid motor, control means for the motor comprising, a fluid pressure operated valve reciprocable between inlet and exhaust positions, means under the control of the motor for controlling reciprocation of said valve as the motor operates, and a control member having an off position in which no fluid is admitted to the valve or motor and a second position in which fluid is admitted to the valve and motor and a third position in which it engages the valve and prevents the valve from reciprocating.

11. In a lubricating device having a fluid motor, control means for the motor comprising, a fluid pressure operated valve reciprocable between inlet and exhaust positions, means under the control of the motor for controlling reciprocation of said valve as the motor operates, a second valve for controlling admission of fluid to the first valve, and an operating member having a portion engageable with said second valve to open it and a portion engageable with said first valve to prevent reciprocation thereof.

12. In a lubricating device having a fluid motor, control means for the motor comprising, a fluid pressure operated valve reciprocable between inlet and exhaust positions, means under the control of the motor for controlling reciprocation of said valve as the motor operates, a second valve for controlling admission of fluid to the first valve, and a slidably mounted operating member having a portion engageable with said second valve to open the second valve during the first part of the movement of the operating member and having another portion engageable with the first valve to prevent reciprocation thereof upon further movement of the operating member.

13. In a lubricating device having a fluid motor, control means for the motor comprising, a fluid pressure operated valve reciprocable between inlet and exhaust positions, means under the control of the motor for controlling reciprocation of said valve as the motor operates, a second valve for controlling admission of fluid to the first valve, and a slidably mounted operating member having a cam shaped portion engageable with the said second valve to open the second valve during the first part of the movement of the operating member and having another portion engageable with the first valve to prevent reciprocation thereof upon further movement of the operating member.

14. In a lubricating device having a fluid motor, control means for the motor comprising, a fluid pressure operated valve reciprocable between inlet and exhaust positions, means under the control of the motor for controlling reciprocation of said valve as the motor operates, a second valve for controlling admission of fluid to the first valve, and a valve operating member slidable along an axis substantially at right angles to the reciprocatory axis of the first valve, said member including a portion to engage and open the second valve during the first part of its movement and a portion movable into the path of the first valve to prevent reciprocation thereof upon further movement of the member.

15. In a lubricating device having a fluid motor, control means for the motor comprising, a fluid pressure operated valve reciprocable between inlet and exhaust positions, means under the control of the motor for controlling reciprocation of said valve as the motor operates, a second valve for controlling admission of fluid to the first valve, and a valve operating member slidable along an axis substantially at right angles to the reciprocatory axis of the first valve, said member including a projecting pin at one end to engage and open the second valve and an enlarged portion adjacent said pin which is movable into the path of the first valve to prevent reciprocation thereof.

16. In a lubricating device having a fluid motor, control means for the motor comprising, a fluid pressure operated valve reciprocable between inlet and exhaust positions, means under the control of the motor for controlling reciprocation of said valve as the motor operates, a second valve for controlling admission of fluid to the first valve, and a valve operating member slidable along an axis substantially at right angles to the reciprocatory axis of the first valve, said member including a cam portion intermediate its ends to open the second valve and a pin at one end to engage the first valve to prevent reciprocation thereof.

17. In a lubricating device having a fluid motor, control means for the motor comprising, a fluid pressure operated valve reciprocable between inlet and exhaust positions, means under the control of the motor for controlling reciprocation of said valve as the motor operates, a second valve for controlling admission of fluid to the first valve, and a valve operating member slidable along an axis concentric with the reciprocatory axis of the first valve, said member including a portion intermediate its ends to open the second valve and an end portion movable into the path of the first valve to prevent reciprocation thereof.

18. In a lubricating device having a fluid motor, control means for the motor comprising, a movable valve controlling the flow of operating fluid to and from the motor, automatic means to control movement of the valve, and control means having three positions, in one of which the supply of operating fluid to the valve and the motor is cut off, in another of which fluid is admitted to the valve and the motor, and in a third of which fluid is admitted to the valve and the motor and automatic operation of the valve is prevented thereby limiting operation of the motor to a single stroke.

19. In a lubricating device having a fluid motor, control means for the motor comprising, a movable valve controlling the flow of operating fluid to and from the motor, means under the control of the motor to control movement of the valve in accordance with movement of the motor, a control member having an off position in which no fluid is admitted to the valve or motor, a second position in which fluid is admitted to the valve and motor and a third position, and means operated by said control member when it is in said third position to prevent movement of the valve, thereby limiting operation of the motor to a single stroke.

20. In a device having a fluid-operated motor, a control for said motor comprising a reciprocably mounted valve having inlet and exhaust positions, resilient means for constantly urging said valve to one of said positions, means to admit fluid pressure to one end of the valve to urge it to the other of said positions, and means controlled by operation of the motor to admit fluid pressure to the other end of the valve to balance the pressure thereon whereby said resilient means may return the valve to said one position.

21. In a device having a fluid-operated motor, a control for said motor comprising a reciprocably mounted valve having inlet and exhaust positions, resilient means for constantly urging said valve to one of said positions, means to admit fluid pressure to one end of the valve to urge it to the other of said positions, means controlled by operation of the motor to admit fluid pressure to the other end of the valve to balance the pressure thereon whereby said resilient means may return the valve to said one position, and means operable at will to engage the valve and prevent movement thereof.

HARRY R. TEAR.